Patented July 11, 1939

2,165,450

UNITED STATES PATENT OFFICE 2,165,450

PRODUCTION OF COLORLESS LIQUID ORGANIC ESTERS

Alfred K. Burke, Flint, Mich., and Thomas J. McKeon, Parlin, N. J., assignors to E. I. du Pont de Nemours & Company, Wilmington, Del., a corporation of Delaware No Drawing. Application September 19, 1934, Serial No. 744,666

4 Claims. (Cl. 260—488)

This invention relates to a process for the removal of color from liquid organic esters which color is imparted to the esters during the manufacturing process.

In the commercial manufacture of various liquid organic esters such as amyl acetate, ethyl and butyl acetate, butyl propionate, and similar products, there is very often produced material which possesses a green or yellow color. The presence of this color is objectionable since it is highly desirable to produce water-white products. The coloring matter cannot be removed by the usual process of rectification since it is apparently volatile and is carried over to the condensate during the distillation process. The production of such discolored material in the present commercial practice is a distinct economic loss since the discolored material must be discarded or marketed as a sub-grade product. The matter is difficult since the trade practically always demands a water-white product as the uses for a discolored product are very limited.

This invention has as an object the removal of undesirable coloring matter, which is imparted thereto during the manufacturing process, from water insoluble liquid organic esters such as are generally used in the arts.

This object is accomplished by the following invention in which the water-insoluble liquid organic ester is treated with an aqueous alkaline solution and the entire liquid mass allowed to settle into two layers, leaving the organic ester layer permanently free from color.

This invention in its embodiment consists of treating the liquid organic esters in a suitable container which is properly equipped with an agitator with an aqueous alkaline solution of from 1 to 15% strength, depending upon the extent of the discoloration, and the entire liquid mass agitated for ½ to 1½ hours. The liquid mass is then allowed to stand without agitation for some time after which it separates into two distinct layers, an ester layer, and an aqueous layer. The aqueous layer is withdrawn from the liquid ester layer and the latter treated by means of agitation with fresh water. After this washing treatment, the ester is finally purified by well known distillation methods used in the purification of organic liquid esters. The product so treated is entirely free from any discoloration.

The following is a specific example of the practice of the invention. To 300 gallons of discolored amyl acetate placed in a suitable container properly equipped with an agitator, are added 100 gallons of a 7.5% aqueous caustic soda solution. The entire liquid mass is vigorously agitated at room temperature for ½ hour. After this period of agitation, the liquid mass is allowed to stand for at least ½ hour after which time two definite liquid layers will be evident. The aqueous caustic soda layer is withdrawn and 100 gallons of fresh water added to the remaining ester layer. Suitable agitation is supplied for a period of one hour and the liquid again allowed to settle until a separation of two layers occurs. The aqueous layer is withdrawn and the decolorized washed esters subjected to the usual distillation process in order to remove the last traces of water. A product entirely free from color is obtained after such treatment.

While in the example given above caustic soda is mentioned as the alkali producing agent, caustic potash can be used with equal success. Other alkali producing materials in aqueous solution such as trisodium phosphate and sodium peroxide can also be used. In fact any of the alkali metal hydroxides or their salts of weak acids which yield strong aqueous solutions may be used with varying degrees of success. Alkaline solutions of less than 1% strength are unsatisfactory and ineffective in removing the color. While a 7.5% aqueous solution as given in the example has been found to yield preferred results greater or lesser strength solutions may be used depending somewhat on the extent of the color in the esters before the treatment. The amount of alkali necessary will be apparent to those skilled in the art, but a concentration sufficient to produce saponification should be avoided.

While a definite theory of the invention has not been fully established, evidence is at hand which indicates that the discoloration is produced during the esterification process by the formation of colored bodies from the aldehydes and ketones, present as impurities in the acids or alcohols used in the production of the esters. These color bodies are more soluble in or are destroyed by the aqueous alkali solution with which the esters are treated. The invention is not to be construed as limited to any particular theory by which it may operate.

This invention has been successfully used commercially in the production of butyl acetate, isobutyl acetate, amyl acetate, ethyl acetate, pentasol acetate, and similar organic liquid esters commonly used in the arts.

The principal advantage of this invention is economic in that discolored material produced which is ordinarily subgrade and must be marketed as such or entirely discarded, can be reclaimed and made first-class material with particular respect to color. A further advantage is that it avoids the use of strong oxidizing agents which have a corrosive action on the usual commercial equipment used. A still further advantage is that the treatment effects neutralization and decoloration of the esters in one treatment.

It is apparent that many widely different embodiments of this invention may be made without departing from the spirit and scope thereof and, therefore, it is not intended to be limited except as indicated in the appended claims.

We claim:

1. The process of removing the discoloration from alkyl esters of acetic acid, the said alkyl portion containing 4–5 carbon atoms which comprises adding thereto a volume of 7.5% sodium hydroxide solution equal to about one eighth the volume of the said ester, agitating the combined mixture for ½ to 1½ hours, allowing the two layers to separate and removing the aqueous layer from the ester.

2. The process of removing the discoloration from butyl acetate which comprises adding thereto a volume of 7.5% sodium hydroxide solution equal to about one eighth the volume of the butyl acetate, agitating the combined mixture for ½ to 1½ hours, allowing the two layers to separate and removing the aqueous layer from the ester.

3. The process of treating liquid alkyl esters which have been manufactured commercially and which have developed during the manufacture a discoloration which is characterized by being green or yellow and in being carried over with the distillate during rectification, which comprises removing the said discoloration by mixing the liquid ester with an aqueous solution containing about 1 to 15% of an alkali metal hydroxide, the said hydroxide being present in amount of approximately 1 to 1.5% by weight of the discolored ester being treated, agitating the mixture thoroughly, allowing two layers to stratify and withdrawing one of them.

4. The process of claim 3 in which the liquids are agitated for about one-half hour to one and one-half hours.

ALFRED K. BURKE.
THOMAS J. McKEON.